United States Patent [19]

Ballmer et al.

[11] Patent Number: 4,529,873
[45] Date of Patent: Jul. 16, 1985

[54] OPTICAL CONTROL CIRCUIT FOR ELECTROCHROMIC LAYERS

[75] Inventors: Horst Ballmer, Heidenheim; Erwin Wiedmann, Essingen, both of Fed. Rep. of Germany

[73] Assignee: Carl-Zeiss-Stiftung, Heidenheim/Brenz, Oberkochen, Fed. Rep. of Germany

[21] Appl. No.: 434,715

[22] Filed: Oct. 15, 1982

[30] Foreign Application Priority Data

Oct. 29, 1981 [DE] Fed. Rep. of Germany ....... 3142907

[51] Int. Cl.³ .............................................. G01J 1/20
[52] U.S. Cl. ..................................... 250/201; 350/357
[58] Field of Search ................ 250/201, 205; 350/357, 350/335, 374

[56] References Cited

U.S. PATENT DOCUMENTS

| | | | |
|---|---|---|---|
| 3,000,262 | 9/1961 | Rabinow et al. | 250/201 |
| 4,229,648 | 10/1980 | Ehrenhaft | 250/205 |
| 4,298,870 | 10/1979 | Saegusa | 350/357 |
| 4,342,906 | 8/1982 | Hyatt | 250/205 |
| 4,384,200 | 5/1983 | Taira | 250/205 |

Primary Examiner—David C. Nelms
Assistant Examiner—J. Gatto
Attorney, Agent, or Firm—Hopgood, Calimafde, Kalil, Blaustein & Judlowe

[57] ABSTRACT

In order to regulate the absorptance of an electrochromic layer, the absorptance of the layer is measured optically. The signal derived therefrom is compared with a guide value and fed to a controller which has a dead zone between two hysteresis regions (at switch points), and charges are fed to or removed from the layer as required. Preferred fields of use are lenses, particularly eyeglass lenses, filters and dimmable mirrors to which an electrochromic layer is applied with provision for controlled change of its absorptance.

16 Claims, 4 Drawing Figures

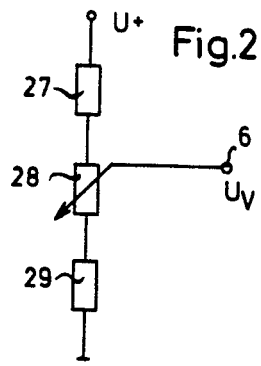
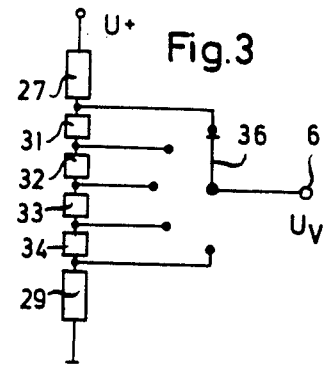
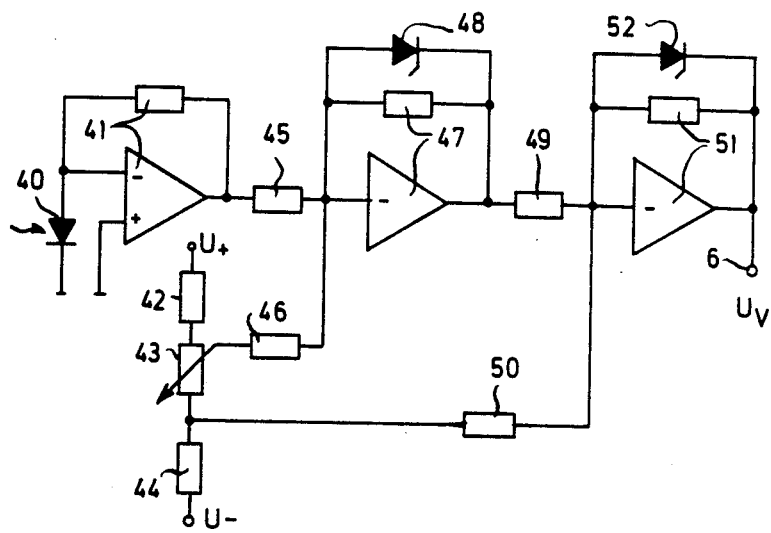

OPTICAL CONTROL CIRCUIT FOR ELECTROCHROMIC LAYERS

BACKGROUND OF THE INVENTION

The present invention relates to a method and apparatus for regulating the absorptance of an electrochromic layer.

Electrochromic layers become dark, i.e., their absorptance increases, when a voltage is applied or when charges are fed to them. Upon removal of charges, the layers become transparent again.

It is known to utilize this phenomenon for display elements, in which only the transparent state and the colored state are used. A specific current is fed for a specific time to establish the colored state. Excessive feed of charges must be avoided, in order to avoid destruction of the electrochromic layer. On the other hand, the decoloring process (transition from colored state to transparent state) is not critical since it is not possible to remove from the layer a greater number of charges than are present in it, and the completely charge-free layer is also the layer with the lowest absorptance. An important advantage of electrochromic layers is that they consume current only during a change in their absorptance.

For display-element purposes, two states of the electrochromic layer are sufficient. For other purposes of use, such as sunglasses, dimmable mirrors and optical filters, however, a larger number of states is advantageous, and continuous adjustability is particularly advantageous. If the sum of the charges fed and removed is used as measure for the absorptance of the layer, then this amount corresponds less and less to the actual absorptance the more frequently one changes between different absorptances. This applies even if the unequal quantities of charge required for coloring and decoloring are taken into account, since these differences can be determined only approximately. The only way out, namely to pass sufficiently frequently through the completely decolored state, is in many applications either not possible or disadvantageous.

In the event of continuously varying control, care should furthermore be taken that the system is not so excessively sensitive as to involve unnecessary control procedures.

BRIEF STATEMENT OF THE INVENTION

The object of the present invention is to provide a method and an arrangement for control of electrochromic layers which make it possible continuously to adjust absorptance, and to obtain good reproducibility even after numerous changes of the absorptance, all without having to establish the completely decolored state from time to time, and avoiding unnecessary control procedures.

The invention achieves this object through optical measurement of absorptance, by comparing the optically measured signal with a guide value, and by supplying the resultant signal to a controller which feeds charges to or removes them from the layer. In one suitable arrangement, the controller has a dead zone and two hysteresis regions.

One advantageous embodiment is characterized by the fact that an optical measuring device is connected to a controller whose input is connected to a circuit part for establishing a desired value, that the regulator is connected to the switch inputs of two sources of limitable current, and that the current sources are connected to the electrochromic layer, for supply or removal of electrical charges.

In another advantageous embodiment, the controller is formed of two operational amplifiers wired as hysteresis devices, so related to each other as to provide a dead zone being between the hysteresis regions.

In a further embodiment, transistors having emitter circuits controlled via base resistors are provided as the sources of limitable current.

The optical measuring device may illustratively comprise a light-emitting diode and a pin diode or a photoresistor which are arranged on opposite sides of the electrochromic layer. It is also possible to arrange both components on the same side of the layer if the opposite side is made reflective. Solar cells can be provided in order to assist the battery. It is also possible to operate the optical measuring device with short intermittent light flashes.

A control potentiometer or a step switch provide alternative arrangements for production of the guide value. However, it is particularly advantageous to produce the guide value using an optical sensor which measures light incident on the electrochromic layer; with this technique, the same brightness is always present behind the layer. In all cases, the guide value is advisedly so limited that its range of values lies between the maximum permissible coloring of the layer and the completely decolored layer.

DETAILED DESCRIPTION

The invention will be described in further detail with reference to FIGS. 1 to 4 of the drawings, in which:

FIG. 2 is a diagram to show a first embodiment of means for producing the guide value;

FIG. 3 is a similar diagram to show another embodiment for production of the guide value; and FIG. 4 is another such diagram to show an embodiment for production of the guide value as a function of brightness.

Figure 1:
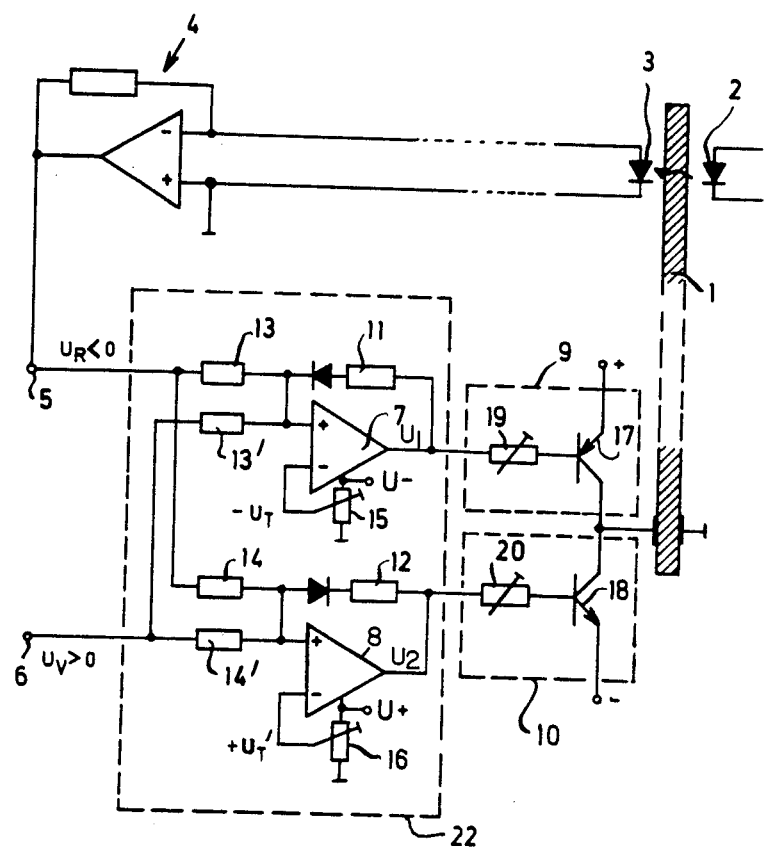
FIG. 1 is a diagram schematically showing an illustrative embodiment of the invention, for controlling the absorptance of an electrochromic layer.

In FIG. 1, 1 designates an electrochromic layer. For measurement of its absorptance, a light-emitting diode 2 serves as a source of light and a pin diode 3 or a phototransistor serves as the receiver of light from said source. A light-impervious covering of the measuring device, to prevent degradation of the measurement result by outside light, has not been shown in the drawing. The signal received at 3 is amplified in an operational amplifier 4 and is available as a control variable $U_R$ at circuit point 5; its value is between $U_{R}min$ for the maximum permissible coloring of the layer and $U_{R}max$ for the completely decolored state of the layer.

The control variable $U_R$ is compared with a guide value $U_V$ present at circuit point 6, and this value will be understood to define the desired absorptance of the layer. With symmetrical dimensioning of the embodiment shown in FIG. 1, the two limit values $U_{R}min$ and $U_{R}max$ of the control variable correspond to the corresponding limit values of the guide value, and the control variable and the guide value are voltages of the same magnitude and opposite polarity. As an initial step, the above-mentioned limit values are determined from the corresponding system states in order suitably to limit the guide value $U_V$.

The control arrangement used is a three-step controller, developed from two operational amplifiers 7 and 8 wired as hysteresis devices, each driving one of two limitable-current sources 9 and 10. The hysteresis regions $-U_H$ and $+U_H'$ of the wired operational amplifiers 7 and 8 are determined by resistors 11, 13 and 13' and 12, 14, 14', respectively, as well as by operating voltages $U+$, $U-$. Voltage values $-U_T$ and $+U_T'$ are adjustable via potentiometers 15 and 16 in order to symmetrically shift the hysteresis regions to the steady state $U_V - U_R = 0$ and thus to determine the width of the dead zone between the hysteresis regions.

As shown, the limitable-current sources 9 and 10 consist of a PNP transistor 17 and an NPN transistor 18, the respective emitters of which are connected to a positive voltage source and to a negative voltage source, their common junction point being connected to the electrochromic layer. Transistors 17 and 18 are controlled via the base resistors 19 and 20 whose value limits charge and discharge current for the electrochromic layer, via current amplification of the transistors alone.

The above-described circuitry is operative to establish the following regions of the controller:

1. In the region $U_V - U_R < -U_H - U_T$, the output voltage $U_1$ of the operational amplifier 7 is negative, and the output voltage $U_2$ of the operational amplifier 8 is also negative. Thus, transistor 17 conducts while the transistor 18 blocks; and the electrochromic layer is colored.

2. In the region $U_V - U_R > U_H' + U_T'$, $U_1$ and $U_2$ are positive. Transistor 17 blocks while transistor 18 conducts; and the layer is decolored.

3. In the region $-U_T < U_V - U_R < U_T'$, $U_1$ is positive and $U_2$ is negative. Both transistors block; and the layer is not changed.

4. In the hysteresis regions $-U_H$ and $+U_H'$ adjoining the dead zones $-U_T$ and $+U_T'$ the active regions overlap the region in which the layer is not changed. In this circumstance, assurance is had (1) that a slight brightening of the electrochromic layer after a concluded change in color does not again immediately cause a new coloring process, and (2) that a slight darkening after a decoloring process does not immediately again cause a new decoloring process.

Having widened the stationary condition around the null point, and having provided hysteresis regions at the borders of the control region, oscillation of the control circuit is prevented and excessively frequent readjustment is avoided.

In FIG. 1, transmitter 2 and receiver 3 are arranged on opposite sides of the electrochromic layer. In another embodiment, the transmitter and receiver are arranged on the same side of the layer, and the other side of the layer is made reflective. In the latter case, the value range for the control variable $U_R$ is twice as large, and the value range for the guide value must be dimensioned accordingly.

FIG. 2 shows an arrangement for production of a guide value $U_V$ by means of which the desired absorptance of the electrochromic layer can be adjusted. The resistors 27-28-29 form a voltage divider, the maximum value and minimum value of the guide value being determined by resistors 27 and 29 in accordance with the limit values $U_R$min and $U_R$max of the control variable.

With a rotary or slide potentiometer at 28, the desired absorptance of the layer can be adjusted in the range between completely colored and completely decolored layer. In FIG. 3, instead of the potentiometer 28, a step switch 36 is used to establish five steps to which the absorptance can be selectively set. Resistors 31 to 34 may be so selected that a uniform, or for example a logarithmic, gradation of the absorptance is available. And it will be understood that potentiometer 28 in FIG. 2 may also have a linear or, for example, a logarithmic characteristic.

FIG. 4 shows a particularly advantageous embodiment for production of the guide value. Light incident on the electrochromic layer is measured by an optical sensor 40, for example, in a pin diode. The signal produced by the sensor 40 is amplified by a wired operational amplifier 41 and is then related to the value set by the user at a potentiometer 43. For this purpose, operational amplifiers 47 and 51 are wired as inverting adders. The operational amplifier 47 with a Zener diode 48 limits the minimum amount of the guide value, and the operational amplifier 51 with the Zener diode 52 limits the maximum amount of the guide value.

Potentiometer 43 enables the user to vary the relationship between light incident on the sensor 40 and the absorptance of the electrochromic layer, i.e., he can select the start of the coloring or decoloring process as a function of the incident light. In this connection, the described limitations assure that the electrochromic layer is not fed any further charges when the maximum permissible color has been reached and that, when the completely decolored condition has been reached, the decoloring process is terminated. It will, of course, be understood that, if desired, the potentiometer 43 of FIG. 4 may be replaced by fixed resistors of suitable size.

The described method and arrangements can be employed particularly advantageously, for example, in the case of sunglasses. Known sunglasses of variable absorptance based on the use of phototropic lenses have the disadvantage that the change in absorptance takes place too slowly and that they are not effective behind the windshield of automobiles. Electrochromic layers do not have these disadvantages. With the circuit arrangements described, the absorptance of sunglasses can be varied either continuously in accordance with the surrounding brightness or stepwise. In the latter case, contact sensors are advisedly used in place of the step switch 36 shown in FIG. 3, and they can, for example, be included in the temple pieces of an eyeglass frame.

In a sunglass application, the current necessary for the described circuitry is supplied by a battery which can be placed in the eyeglass frame. Since the consumption of current of the light-emitting diode 2 necessary for the optical measurement of absorptance is relatively great, it is advisable to provide, in order to assist the battery, solar cells which are also integrated into the frame of the glasses. Because of the consumption of current, it is also advantageous not to effect a continuous optical measurement (with constant light) but rather—if no control process is being carried out—to carry out, for example every second, only one measurement with a brief light pulse.

The described arrangements are particularly advantageous in eyeglasses with prescribed optical effect, in which case the same spectacles can be used as ordinary eyeglasses and as sunglasses. It is furthermore possible to color the eyeglass lenses, by different contacting, more strongly in their upper region than in their lower region and thus to obtain the effect of so-called driver's sunglasses in which the instrument panel is observed through a less-colored part.

The invention also lends itself to use in optical arrangements in which a desired difference in reflectivity is replaced by a difference in absorptivity. One example consists of dimmable automobile rearview mirrors, which conventionally comprise a plate of glass and a mirror therebehind, the mirror being adapted to be swung away in the event of too great an incidence of light. This solution, however, has disadvantages: the mirror must be swung away by hand, which is possible with slight mechanical expense only in the case of inside mirrors. Automation is possible only at relatively high expense. On the other hand, with the invention, a difference in reflectivity can be obtained using a (stationary) plate of glass having a mirror on its rear surface and an electrochromic layer applied to the front surface; and, using arrangements described in FIGS. 1 to 3, a temporary dimming effect can be obtained by actuating a potentiometer or a step switch, which is of particular advantage in the case of outside mirrors. Such an arrangement also has the general advantage that the operating element can be located completely independently of the mirror, for example, operable via push buttons. For this purpose of use, the brightness-controlled production of the guide value shown in FIG. 4 is particularly advantageous since, as a result of it, the absorptance of the rearview mirror is automatically increased in the case of dazzling incident light and is reduced upon termination of dazzling, all without the driver having to do anything. The control potentiometer 43 makes it possible to adapt to individual desires at any time.

Another field of use consists of optical instruments in which a light ray. Thus, for example, in the case of microscopes it may be desired that the image shall always have the same brightness, regardless of the degree of magnification. For this purpose, a flat glass plate having an electrochromic layer is placed at a suitable point in the microscope ray path and its absorptance changed by one of the described arrangements. Thus, for example, the step switch 36 can be connected directly to a magnification changer or to a lens turret, and the resistors 31 to 34 can be adapted precisely to the difference in brightness present at the time. In operation microscopes with a zoom magnification device, the automatic control described in FIG. 4 (using an optical sensor) is particularly advantageous. In all cases, the electrochromic layer may also be applied to an optical component of the existing apparatus.

One great advantage of all the described arrangements is that, even after a very large number of changes of the absorptance of the electrochromic layer, excellent reproducibility is obtained, without having to re-establish the completely decolored state.

What is claimed is:

1. Apparatus for variable charge control of an electrochromic layer, said layer being uncolored for the case of no charge in said layer and being colored to a progressively increasing state of coloration for progressively increasing charges in said layer, said apparatus comprising: a light source and a photoelectric receiver positioned to locally expose a portion of said electrochromic layer to a predetermined quantum of light from said source and to produce an electrical output signal in response to that fraction of said quantum as is passed at least once through said layer, whereby said electrical signal is a measure of the instantaneous colored state of said layer; a charging circuit connected to charge said layer, a charge-removal circuit connected to remove charge from said layer, guide-value means establishing a guide-value signal, and a controller having a connection to said guide-value means and a connection to the output of said receiver, said controller being connected to control charging-circuit operation for a detected receiver-output signal of predetermined excess with respect to the guide-value signal and to control operation of said charge-removal circuit for a detected receiver-output signal of predetermined deficiency with respect to the guide-value signal; said guide-value means being continuously variable between upper and lower limits of guide-value signal corresponding to predetermined limits of charge application to and of charge removal from said layer, and said guide-value means including an optical sensor responsive to brightness independent of transmission through said layer and being operative to produce a brightness-responsive guide-value signal which is within said predetermined limits.

2. Apparatus for variable charge control of an electrochromic layer, said layer being uncolored for the case of no charge in said layer and being colored to a progressively increasing state of coloration for progressively increasing charges in said layer, said apparatus comprising: a light source and a photoelectric receiver positioned to locally expose a portion of said electrochromic layer to a predetermined quantum of light from said source and to produce an electrical output signal in response to that fraction of said quantum as is passed at least once through said layer, whereby said electrical signal is a measure of the instantaneous colored state of said layer; a charging circuit connected to charge said layer, a charge-removal circuit connected to remove charge from said layer, guide-value means establishing a guide-value signal, and a controller having a connection to said guide-value means and a connection to the output of said receiver, said controller being connected to control charging-circuit operation for a detected receiver-output signal of predetermined excess with respect to the guide-value signal and to control operation of said charge-removal circuit for a detected receiver-output signal of predetermined deficiency with respect to the guide-value signal; said guide-value means being continuously variable between upper and lower limits of guide-value signal corresponding to predetermined limits of charge application to and of charge removal from said layer.

3. Apparatus for variable charge control of an electrochromic layer, said layer being uncolored for the case of no charge in said layer and being colored to a progressively increasing state of coloration for progressively increasing charges in said layer, said apparatus comprising: a light source and a photoelectric receiver positioned to locally expose a portion of said electrochromic layer to a predetermined quantum of light from said source and to produce an electrical output signal in response to that fraction of said quantum as is passed at least once through said layer, whereby said electrical signal is a measure of the instantaneous colored state of said layer; a charging circuit connected to charge, said layer, a charge-removal circuit connected to remove charge from said layer, guide-value means establishing a guide-value signal, and a controller having a connection to said guide-value means and a connection to the output of said receiver, said controller being connected to control charging-circuit operation for a detected receiver-output signal of predetermined excess with respect to the guide-value signal and to control operation of said charge-removal circuit for a detected receiver-output signal of predetermined deficiency with respect to the guide-value signal; said guide-value means including an optical sensor responsive to ambient brightness independent of transmission through said layer and being operative to produce a continuously varying brightness-responsive guide-value signal which is within said predetermined limits.

4. Apparatus according to claim 2 or claim 3, in which said controller has a dead zone between switch points one of which determines an operation of said charging circuit and the other of which determines an operation of said charge-removal circuit.

5. Apparatus according to claim 2, in which said controller comprises two operational amplifiers wired as hysteresis devices, with a dead zone between the hysteresis regions.

6. Apparatus according to claim 2 or claim 3, in which said controller comprises two operational amplifiers wired as hysteresis devices, with a dead zone between the hysteresis regions, and in which each of said charging and charge-removal circuits includes the emitter circuit of a transistor, and in which the base resistors of said transistors are connected to the outputs of the respective operational amplifiers.

7. Apparatus according to claim 2 or claim 3, in which said light source and photoelectric receiver are respectively positioned on opposite sides of the electrochromic layer.

8. Apparatus according to claim 2 or claim 3, in which said light source and photoelectric receiver are positioned on the same side of said electrochromic layer and in which the other side of said layer is locally reflecting of light from said source to said receiver.

9. Apparatus according to claim 2 or claim 3, wherein a solar cell at least in part provides electrical power for the apparatus.

10. Apparatus according to claim 2, in which said guide-value means includes a voltage source and a variable potentiometer to provide continuous variation of guide-value voltage.

11. Apparatus according to claim 2, in which said guide-value means includes a voltage source, a multiple-tap resistor and a step switch connected to the respective resistor taps to provide a continuous progression of stepped variation of guide-value voltage.

12. Apparatus according to claim 2, in which said guide-value means includes an optical sensor responsive to ambient brightness independent of transmission through said layer and being operative to produce a continuously varying brightness-responsive guide-value signal which is within said limits.

13. Apparatus according to claim 12, in which the optical sensor is connected to the controller via a wired operational amplifier and via two operational amplifiers wired as inverting adders.

14. Apparatus according to claim 2 or claim 3, wherein said electrochromic layer is an element of a sunglass lens.

15. Apparatus according to claim 2 or claim 3, wherein said electrochromic layer is an element of a dmmable mirror.

16. Apparatus according to claim 2 or claim 3, wherein said electrochromic layer is an element of an optical filter.

* * * * *